United States Patent
Fleischman

[11] 3,915,559
[45] Oct. 28, 1975

[54] SHORT FOCAL LENGTH LARGE APERTURE OPTICAL SYSTEM

[75] Inventor: Andor A. Fleischman, Northbrook, Ill.

[73] Assignee: Bell & Howell Company, Chicago, Ill.

[22] Filed: Oct. 15, 1974

[21] Appl. No.: 514,336

[52] U.S. Cl. ............................. 350/220; 350/176
[51] Int. Cl.² .................................... G02B 9/34
[58] Field of Search ....................... 350/220, 176

[56] References Cited
UNITED STATES PATENTS
3,868,174  2/1975  Yokota ..................... 350/220 X

*Primary Examiner*—Paul A. Sacher
*Attorney, Agent, or Firm*—John E. Peele, Jr.

[57] ABSTRACT

This invention relates to a short focal length, large aperture optical system primarily designed to efficiently transmit light rays to an image plane with an extraordinarily high degree of correction over a prescribed field.

9 Claims, 27 Drawing Figures

SHORT FOCAL LENGTH LARGE APERTURE OPTICAL SYSTEM

This invention relates to a short focal length, large aperture optical system primarily intended for use in optical instruments.

Optical systems have been designed to efficiently transmit light rays to an image plane with an extraordinarily high degree of correction over a prescribed field. The optical system is of short focal length and high aperture to efficiently transmit light rays of a predetermined wavelength from a source of small size and to image the rays without degradation on an image plane at a smaller size than that of the source, in this instance, a focused laser. Because the optical system is intended for use in a mass-produced instrument, such as video disc player, light weight, simplicity of design, ease of assembly and low cost are all desired features. To accomplish these desired results, the optical systems are alternatively designed with plastic elements, some having aspheric surfaces, with relatively easy to manufacture glass elements, or a combination of glass and plastic elements. The resulting optical systems are of relatively light weight and relatively low cost, yet are essentially diffraction limited over the prescribed field thereby providing an image of substantially better correction than might be anticipated. Further, the designs have the desired high performance characteristics notwithstanding anticipated tolerance variations during manufacture and assembly.

An object of the invention is to provide a short focal length, high aperture optical system for efficient transmission of light rays of a predetermined wavelength from a light source of limited diameter and to image the rays without degradation on an image plane at a smaller size than that of the source.

Other objects and advantages of the invention will become apparent from the detailed description which follows when taken in conjunction with the accompanying drawings in which:

Referring to the drawings, optical systems are shown for critically imaging light rays from a source having a limited diameter and essentially a single wavelength. In this preferred embodiment, the light rays emanate from a source such as a focused laser having a wavelength of 6328 Angstroms. The arrangement of optical elements, configured as hereinafter described, provides for critically imaging the bundle of light rays to a point source of extremely small diameter, while providing a lightweight, highly corrected optical system which can be economically manufactured.

The optical systems have similar arrangements of elements with the first element $L_1$ starting at the ray entrance side of the system and positioned nearest the light source (not shown), being a positive element. The light beam exits from the first element $L_1$ slightly convergent.

A second element $L_2$ is a negative meniscus element axially separated and air spaced from the first element $L_1$. The second element collects the slightly convergent light beam from the first element and re-directs the rays to an air spaced third element $L_3$.

A third element $L_3$ is of slightly positive power and functions with positive element $L_4$ as a positive power component group for relaying the light bundle to the image plane to form a reduced image of the object.

A planar member $L_5$ of glass or other optical material is essentially a protective cover to reduce the potential damage to a surface carrying optically coded information at the image plane. The optical designs may be modified to be used with or without the protective cover.

Figure 1:
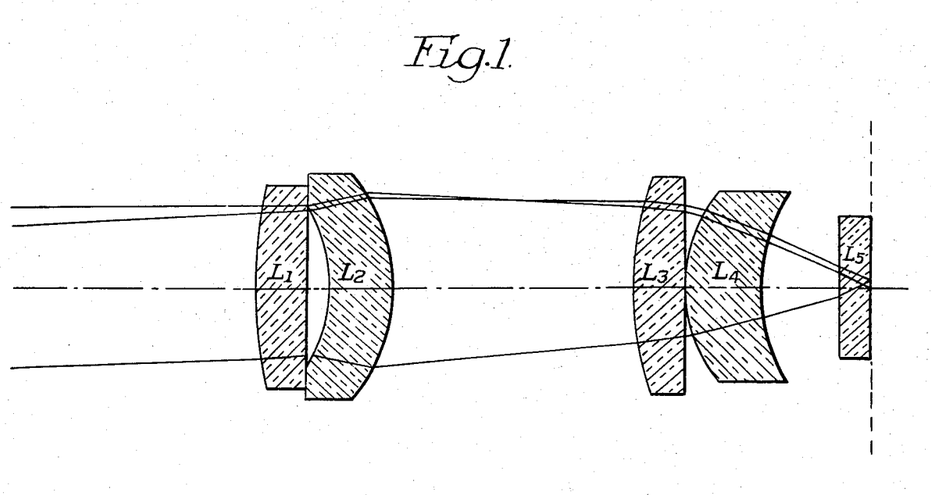
FIG. 1 is a diagrammatic sectional view of a preferred optical system according to the present invention.

The optical system of FIG. 1 is an 8.15mm (0.3210 inch) focal length objective having an effective aperture of $f/1.15$ (NA= 0.45). The system has a half angle of field of 2.58° and is essentially diffraction limited over this prescribed field. As seen in FIGS. 2a – 2h which diagrammatically represent aberrations of the FIG. 1 optical system, a combined high degree of correction is obtained while maintaining an extremely short focal length and a large effective aperture.

The optical values of the optical system of FIG. 1 are as follows:

TABLE 1

EFL = 8.15mm
½ Angle of Field = 2.58°

| LENS | RADII (IN.) | THICKNESS (IN.) | SPACING (IN.) |
|---|---|---|---|
| $L_1$ | $R_1$ = .7769 | $D_1$ = .0789 | $S_1$ = .0420 |
|  | $R_2$ = – 2.3681 |  |  |
| $L_2$ | $R_3$ = – .2595 | $D_2$ = .1018 | $S_2$ = .4138 |
| $L_3$ | $R_5$ = .5445 | $D_3$ = .0825 | $S_3$ = .0050 |
| $L_4$ | $R_7$ = .2298 | $D_4$ = .1252 | $S_4$ = .1242 |
|  | $R_8$ = – .3047 |  | BFL= .1734 |
| $L_5$ | $R_9$ = Inf. | $D_6$ = .0492 | $0 \leqslant S_5 \leqslant .1092$ |
|  | $R_{10}$= Inf. |  |  |

For ELEMENTS $L_1$ to $L_4$, V=25.4, $N_d$=1.805
ELEMENT $L_5$ is a cover plate

In the above table, the first column lists the lens elements numerically starting at the ray entrance side of the system. The second column lists the respective radii of surfaces of the elements. The third column lists the thickness of the respective elements. The fourth column lists the spacing between adjacent elements and the image plane. "EFL" is the effective focal length of the lens system. Individually, the effective focal length of element $L_1$ is 1.4187, $L_2$ is –13.5514, $L_3$ is 0.7026, and $L_4$ is 0.6731 in inches. "½ Angle of Field" is the angle between the continuation of the lens axis and a line from the nodal point of the lens to the most oblique point of the field carrying coded information. "BFL" is the back focal length of the optical system beyond the last element ($L_4$) and includes the cover plate member which may be variably positioned in the space.

Figure 2A:
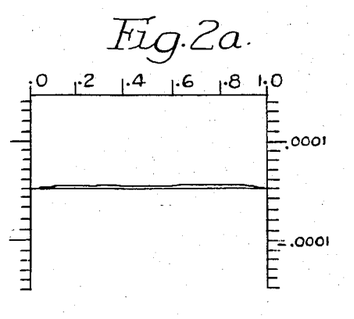
FIGS. 2a to 2h are graphical representations of the various aberrations of the lens system shown in FIG. 1 and having the design data given in Table 1.
Figure 2B:
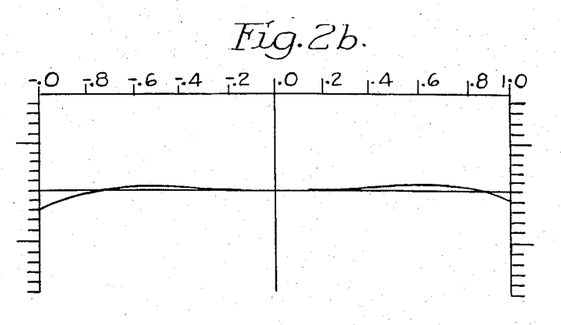
Figure 2C:
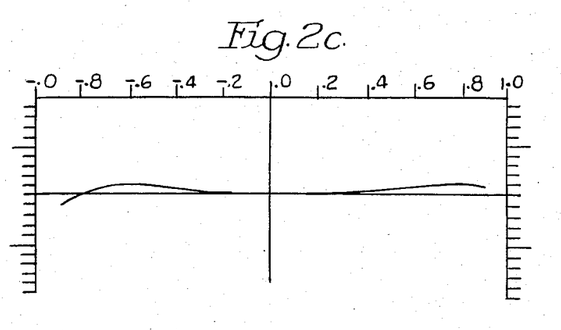
Figure 2D:
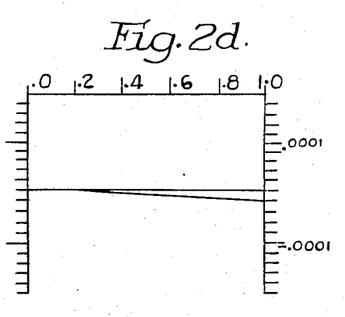
Figure 2E:
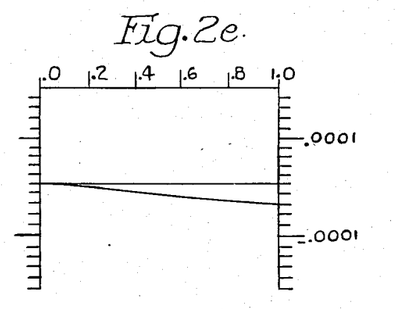
Figure 2F:
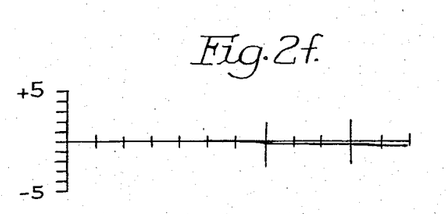
Figure 2G:
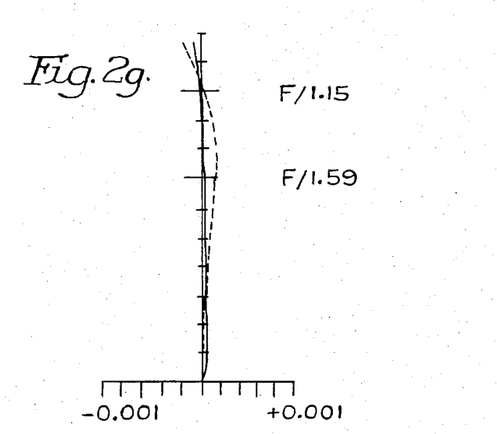
Figure 2H:
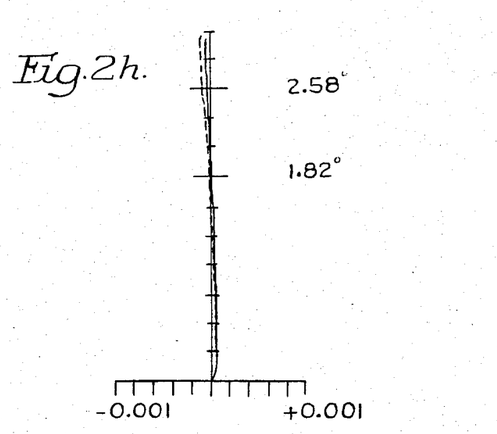

FIG. 2 to 2h graphically represent various aberrations of this form of the optical system, as shown in FIG. 1 and having the design data recited in Table 1. FIG. 2a represents the monochromatic correction of the rays on axis. FIG. 2b represents off axis aberrations of a ray passing from the zone of the film format and through the lens transversely and tangentially. FIG. 2c represents the aberrations of the rays passing from the corner of the field covered through the lens tangentially and transversely. FIG. 2d represents the radial or longitudinal aberrations from the zone of the film format of rays entering the lens at 3 o'clock, while FIG. 2e represents similar aberrations from full field or corner rays. FIG. 2f represents distortions as a percentage of a "perfect" image. FIG. 2g represents the spherical aberrations by a full line and the offense-against-sine-condition by the dotted line. FIG. 2h represents the curvature of field with tangential curvature being shown in full line and sagittal curvature being shown in dashed line.

Figure 3:
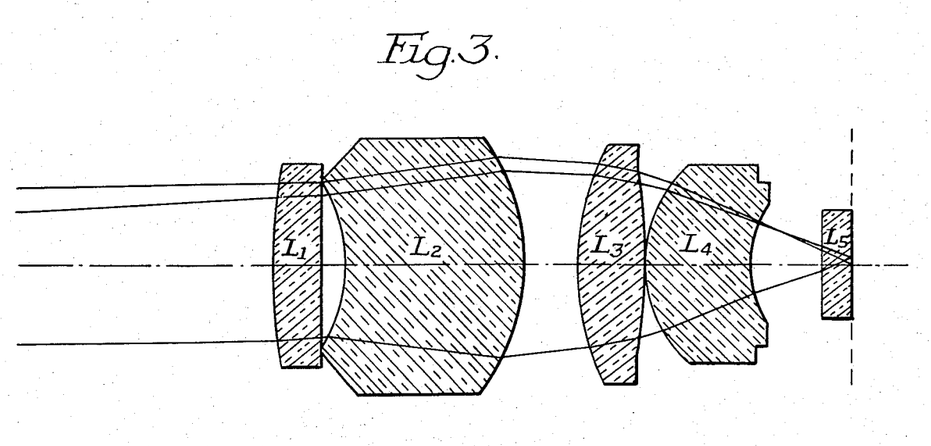
FIG. 3 is a diagrammatic sectional view of an optical system similar to the optical system of FIG. 1.
Figure 4A:
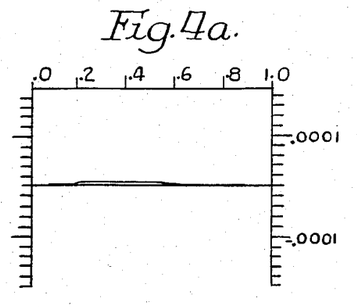
FIGS. 4a to 4h are graphical representations of the various aberrations of the lens system shown in FIG. 3 and having the design data given in Table 3.
Figure 4B:
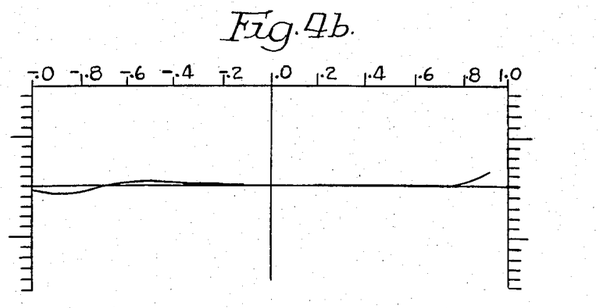
Figure 4C:
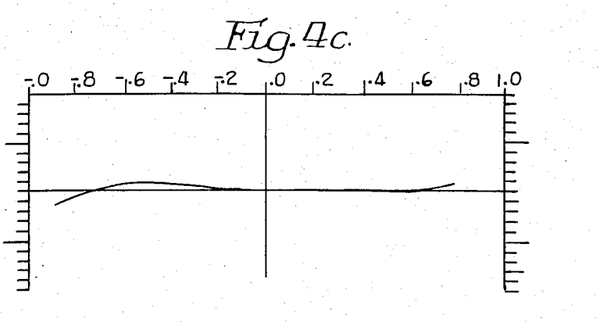
Figure 4D:
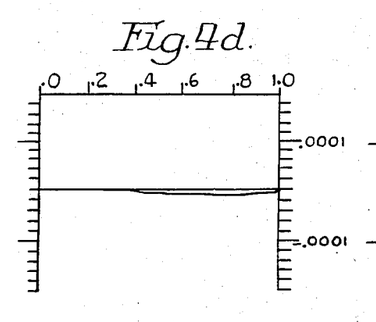
Figure 4E:
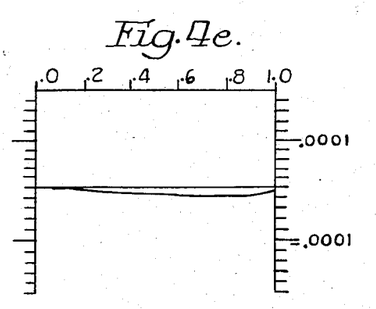
Figure 4F:
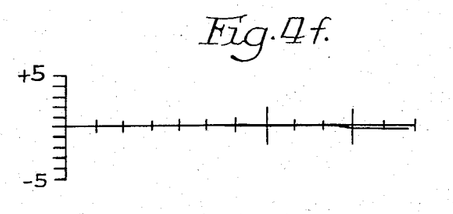
Figure 4G:
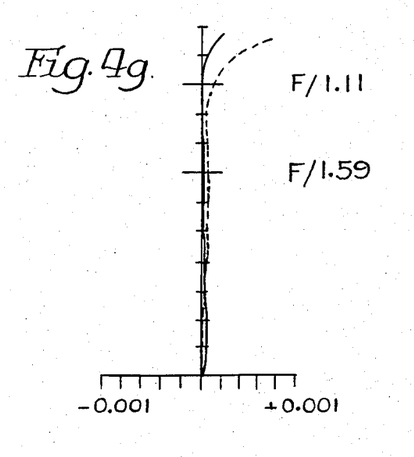
Figure 4H:
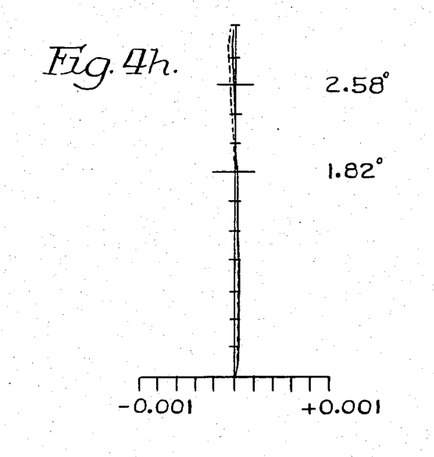

In FIG. 3, a modified optical system of similar optical characteristics and a similar high degree of correction to the glass design of FIG. 1 is shown. The optical system of FIG. 3 is of lighter weight and is less expensive in that the elements are manufactured, preferably of molded plastic such as acrylic and particularly of polymethylmethacrylate. One element ($L_3$) is provided with an aspheric surface $S_6$ in the positive component group of the system. The aspheric element enables obtaining the desired degree of correction with even less weight and the use of less expensive plastic material. By manufacture of the elements of plastic, enabling molding of aspheric surfaces and surfaces having smaller than usual radii, the optical system can be more economically manufactured than might be anticipated.

The optical values of the optical system of FIG. 3 are as follows:

TABLE 3

EFL. = 7.90 mm
½ Angle of Field = 2.58°

| LENS | RADII (IN.) | THICKNESS (IN.) | SPACINGS (IN.) |
|---|---|---|---|
| $L_1$ | $R_1$ = .8907<br>$R_2$ = 2.6356 | $D_1$ = .0847 | $S_1$ = .0368 |
| $L_2$ | $R_3$ = −.2547<br>$R_4$ = .3533 | $D_2$ = .3018 | $S_2$ = .0897 |
| $L_3$ | $R_5$ = .4093<br>$R_6$ = A(1) | $D_3$ = .1192 | $S_3$ = .0000 Et |
| $L_4$ | $R_7$ = .2320<br>$R_8$ = −.1818 | $D_4$ = .1771 | $S_4$ = .1200<br>BFL= .1692 |
| $L_5$ | $R_9$ = Inf.<br>$R_{10}$ = Inf. | $D_5$ = .0492 | 0 ≤ $S_5$ ≤ .0800 |

In the above table, the first column lists the lens elements, numerically starting at the ray entrance side of the system, being formed for example by molding from plastic, such as polymethylmethacrylate except the planar glass plate $L_5$. Each of the plastic elements has the same dispersive index and refractive index, i.e., V=57.4 and $N_D$=1.4917 and $N_{(6328\,A)}$=1.4898. The second column lists the respective radii and the aspheric term A, which is derived by the formula:

$$Z_1 = (K(H^2 - Z_0^2) + 2(AH^4 + BH^6 + CH^8 + DH^{10}))/(2(1 - KZ_0))$$
$$1/K = \text{RADIUS}$$

| RADIUS | = | .93521 |
|---|---|---|
| K | = | 1.06928 |
| A | = | −0.37675×10$^1$ |
| B | = | 0.14624×10$^2$ |
| C | = | −0.14624×10$^2$ |
| D | = | −0.18727×10$^4$ | where 1/K is the vertex radius of curvature of the surface of the element; H is the Cartesian coordinate of a point on the surface referred in a vertical axis; Z is the Cartesian coordinate of a point on the surface referred in a horizontal axis. The third column lists the thickness of the respective elements. The fourth column lists the axial spacings between the respective elements and the nominal image plane.

FIGS. 4a to 4h represent aberrations related to the optical system of FIG. 3 and Table 3 as the aberrations referenced to FIGS. 2a to 2h.

Figure 5:
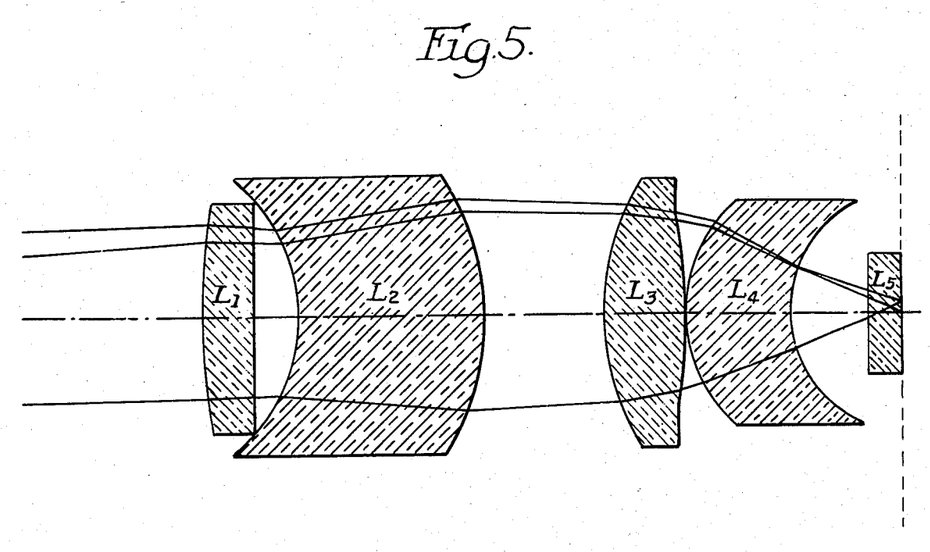
FIG. 5 is a diagrammatic sectional view of an optical system similar to the optical system of FIG. 1.
Figure 6A:
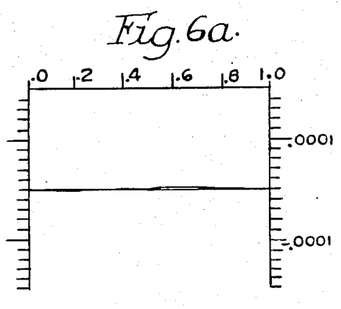
FIGS. 6a to 6h are graphical representations of the various aberrations of an optical system shown in FIG. 5 and having the design data given in Table 5.
Figure 6B:
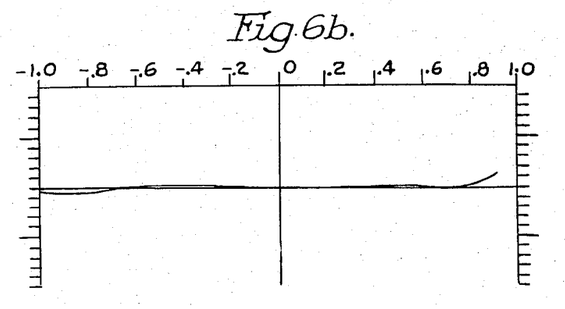
Figure 6C:
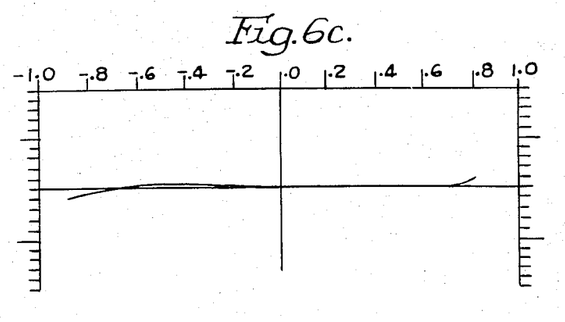
Figure 6D:
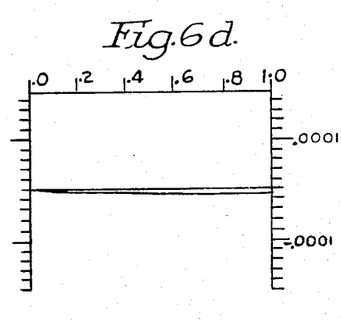
Figure 6E:
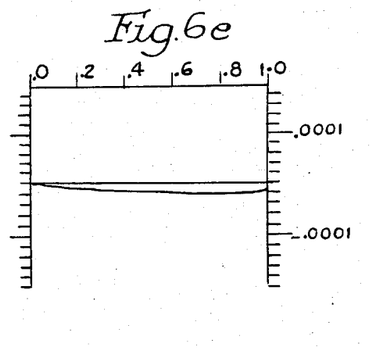
Figure 6F:
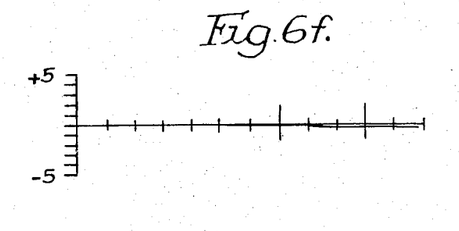
Figure 6G:
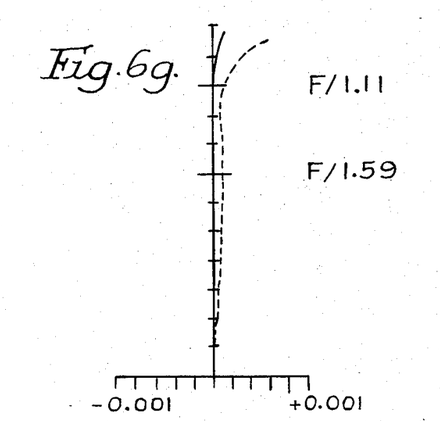
Figure 6H:
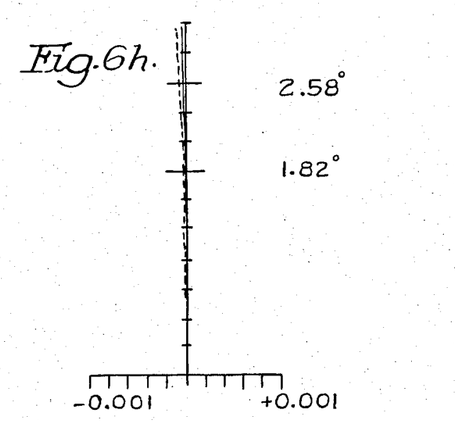

The optical system of FIG. 5 is an 8.37mm (0.3296 inch) focal length objective having an effective aperture of f/1.18 (NA= 0.45). The system has a half angle of field of 2.58° and is essentially diffraction limited over this prescribed field. Aberrations of the FIG. 5 optical system are diagrammatically represented in FIGS. 6a – 6h.

The optical values of the optical system of FIG. 5 are as follows:

TABLE 5

EFL = 8.37mm
½ Angle of Field = 2.58°

| LENS | RADII (IN.) | THICKNESS (IN.) | SPACING (IN.) |
|---|---|---|---|
| $L_1$ | $R_1$ = 1.2531<br>$R_2$ = 3.6496 | $D_1$ = .0850 | $S_1$ = .0360 |
| $L_2$ | $R_3$ = −.2564<br>$R_4$ = .3497 | $D_2$ = .2700 | $S_2$ = .0960 |
| $L_3$ | $R_5$ = .4348<br>$R_6$ = A(1) | $D_3$ = .1130 | $S_3$ = .0050 |
| $L_4$ | $R_7$ = .2344<br>$R_8$ = −.1818 | $D_4$ = .1800 | $S_4$ = .1268<br>BFL= .1760 |
| $L_5$ | $R_9$ = Inf.<br>$R_{10}$ = Inf. | $D_5$ = .0492 | 0 < $S_5$ < .0868 |

ELEMENT $L_1$, V=29.5, $N_D$=1.717
ELEMENTS $L_2$ to $L_4$, V=57.4, $N_D$=1.4917
Element $L_5$ is a glass plate In the above table, the first column lists the lens elements numerically starting at the ray entrance side of the system. The second column lists the respective radii and the aspheric term A, which is derived by the formula:

$$Z_1 = (K(H^2 - Z_0^2) + 2(AH^4 + BH^6 + CH^8 + DH^{10}))/(2/1 - KZ_0)),$$
$$\text{where } 1/K = \text{RADIUS}$$

| Radius | .98039 |
|---|---|
| K | 1.02000 |
| A | −.30000×10$^1$ |
| B | .76000×10$^1$ |
| C | .41900×10$^2$ |
| D | −.30000×10$^4$ | where 1/K is the vertex radius of curvature of the surface of the element; H is the Cartesian coordinate of a point on the surface referred in a vertical axis; Z is the Cartesian coordinate of a point on the surface referred in a horizontal axis. The third column lists the thickness of the respective elements. The fourth column lists the axial spacings between the respective elements and the nominal image plane. "EFL" is the effective focal length of the lens system. "½ Angle of Field" is the angle between the continuation of the lens axis and a line from the nodal point of the lens to the most oblique point recorded on the film.

FIGS. 6a to 6h graphically represent various aberrations of this optical system, as shown in FIG. 5 and having the design data recited in Table 5.

TABLE 7

| LENS | RADII (IN.) | EFL = 10.31mm ½ Angle of Field = 2.58° THICKNESS (IN.) | SPACING (IN.) | V | $N_D$ |
|---|---|---|---|---|---|
| $L_1$ | $R_1 =$ .7875 $R_2 = -$ 2.4274 | $D_1 = .0788$ | $S_1 = .0434$ | 25.4 | 1.805 |
| $L_2$ | $R_3 = -$ .2580 $R_4 =$ .3100 | $D_2 = .1200$ | $S_2 = .4077$ | 57.4 | 1.4917 |
| $L_3$ | $R_5 =$ .5425 $R_6 = -21.4864$ | $D_3 = .0900$ | $S_3 = .0050$ | 25.4 | 1.805 |
| $L_4$ | $R_7 =$ .2306 $R_8 = -$ .3056 | $D_4 = .1250$ | $S_4 = .1588$ BFL = .2180 | 57.4 | 1.4917 |
| $L_5$ | $R_9 =$ Inf. $R_{10} =$ Inf. | $D_5 = .0492$ | $0 \leq S_5 \leq .1538$ | | |

In the above table, the first column lists the lens elements numerically starting at the ray entrance side of the system. The second column lists the respective radii of surfaces of the elements. The third column lists the thickness of the respective elements. The fourth lists the spacing between adjacent elements. The fifth and sixth column list respectively the dispersion index V and the refractive index N of the optical material used for the elements.

An alternative embodiment to the optical system Table 7 is detailed where different in Table 8 below. For element $L_4$, glass is substituted for plastic providing for a greater overall magnification by the optical system.

TABLE 8

| LENS | RADII (IN.) | EFL = 8.44mm ½ Angle of Field = 2.58° THICKNESS (IN.) | SPACING (IN.) |
|---|---|---|---|
| $L_4$ | $R_7 = .2306$ $R_8 = .3056$ | $D_4 = .1250$ | $S_4 = .1577$ |
| $L_5$ | $R_9 =$ Inf. $R_{10} =$ Inf. | $D_5 = .0492$ | BFL = .2069 $0 \leq S_5 \leq .1067$ |

The dispersive index or Abbe number V of element $L_4$ is 25.4 and the refractive index "$N_D$" is 1.805. The effective focal length of the element is 0.06772 inches.

In Table 9 below, a modified optical system of a similar combination of glass and plastic elements provides similar optical characteristics and a similar high degree of aberrations correction to the other designs is shown.

The optical values of the optical system of Table 9 are as follows:

TABLE 9

| LENS | RADII (IN.) | EFL = 7.88mm (.3104 inches) ½ Angle of Field = 2.58° THICKNESS (IN.) | SPACING (IN.) |
|---|---|---|---|
| $L_1$ | $R_1 = 1.3717$ $R_2 = 3.1880$ | $D_1 = .0802$ | $S_1 = .0384$ |
| $L_2$ | $R_3 = -.2510$ $R_4 = .3490$ | $D_2 = .2942$ | $S_2 = .0903$ |
| $L_3$ | $R_5 = .4124$ $R_6 = A(1)$ | $D_3 = .1195$ | $S_3 = .005$ |
| $L_4$ | $R_7 = .2341$ $R_8 = -.1818$ | $D_4 = .1784$ | $S_4 = .1892$ |
| $L_5$ | $R_9 =$ Inf. $R_{10} =$ Inf. | $D_5 = .0492$ | BFL = .2384 $0 \leq S_5 \leq .020$ |

ELEMENT $L_1$, V = 29.51, $N_D$ = 1.7172
ELEMENT $L_2$ to $L_4$, V = 57.4, $N_D$ = 1.4917
ELEMENT $L_5$ is a planar plate In the above table, the first column lists the lens elements, numerically starting at the ray entrance side of the system, including the planar plate $L_5$. The second column lists the respective radii and the aspheric term A, which is derived by the formula:

$$Z_1 = (K(H^2 - Z_0^2) + 2(AH^4 + BH^6 + CH^8 + DH^{10}))/(2(1 - KZ_0))$$

where $1/K$ = RADIUS

| Radius | .90208 |
|---|---|
| K | 1.1085 |
| A | −3.7227 |
| B | 1.3928 |
| C | −4.1692 |
| D | −1817.0 | where $1/K$ is the vertex radius of curvature of the surface of the element; H is the Cartesian coordinate of a point on the surface referred in a vertical axis; Z is the Cartesian coordinate of a point on the surface referred in a horizontal axis. The third column lists the thickness of the respective elements. The fourth column lists the axial spacings between the respective elements and the nominal image plane.

Table 10, which follows, details a slightly modified four element optical system using a combination of plastic and glass elements with or without a planar glass plate. The optical layout is similar to the system of Table 5, and has aberrations similar to those identified in FIGS. 6a–6h with respect to the optical system of FIG. 5.

TABLE 10

| LENS | RADII (IN.) | EFL = 7.88mm (.3104 inches) ½ Angle of Field = 2.58° THICKNESS (IN.) | SPACING (IN.) |
|---|---|---|---|
| $L_1$ | $R_1 = .8907$ $R_2 = 2.6356$ | $D_1 = .0847$ | $S_1 = .0384$ |
| $L_2$ | $R_3 = -.2547$ $R_4 = .3533$ | $D_2 = .3018$ | $S_2 = .0903$ |
| $L_3$ | $R_5 = .4093$ $R_6 = A(1)$ | $D_3 = .1192$ | $S_3 = .0050$ |
| $L_4$ | $R_7 = .2320$ $R_8 = -.1818$ | $D_4 = .1771$ | $S_4 = .1692$ BFL |

ALL ELEMENTS, V=57.4, $N_D$=1.4917

In the above table, the first column lists the lens elements numerically starting at the ray entrance side of the system. The second column lists the respective radii and/or the aspheric surfaces of the elements. The values for substitution in the aspheric formula are as set forth with respect to Table 9. The third column lists the thickness of the respective elements. The fourth column lists the spacing between adjacent elements and the nominal image plane. The optical design may be modified to be used with or without the protective cover.

Tables 11 and 12, which follow, detail all glass optical systems having optical layouts similar to those identified in the drawings. As to both tables, the columns related information as set forth with respect to the foregoing tables.

TABLE 11

EFL = 8.18mm (.3222 inches)
½ Angle of Field = 2.58°

| LENS | RADII (IN.) | THICKNESS (IN.) | SPACING (IN.) |
|---|---|---|---|
| $L_1$ | $R_1 = .5791$<br>$R_2 = -6.1495$ | $D_1 = .1172$ | $S_1 = .0129$ |
| $L_2$ | $R_3 = -.7452$<br>$R_4 = 2.9214$ | $D_2 = .1073$ | $S_2 = .3774$ |
| $L_3$ | $R_5 = .5840$<br>$R_6 = 1.9319$ | $D_3 = .1325$ | $S_3 = .0030$ |
| $L_4$ | $R_7 = .1974$<br>$R_8 = -.1957$ | $D_4 = .1606$ | $S_4 = .0450$ |
| $L_5$ | $R_9 = $ Inf.<br>$R_{10} = $ Inf. | $D_5 = .0492$ | BFL = .0942<br>$0 \leq S_5 \leq .0050$ |

ALL ELEMENTS V = 25.4, $N_D$ = 1.805

TABLE 12

EFL = 8.09mm (.3185 inches)
½ Angle of Field = 2.58°

| LENS | RADII (IN.) | THICKNESS (IN.) | SPACING (IN.) |
|---|---|---|---|
| $L_1$ | $R_1 = 1.1900$<br>$R_2 = 1.1900$ | $D_1 = .0958$ | $S_1 = .0108$ |
| $L_2$ | $R_3 = -.5100$<br>$R_4 = .8665$ | $D_2 = .1560$ | $S_2 = .3430$ |
| $L_3$ | $R_5 = .4240$<br>$R_6 = -74.0690$ | $D_3 = .1220$ | $S_3 = .0030$ |
| $L_4$ | $R_7 = .2960$<br>$R_8 = -.3640$ | $D_4 = .1810$ | $S_4 = .0450$ |
| $L_5$ | $R_9 = $ Inf.<br>$R_{10} = $ Inf. | $D_5 = .0492$ | BFL = .0990<br>$0 \leq S_5 \leq .0048$ |

ALL ELEMENTS V = 25.4, $N_D$ = 1.805
ELEMENT $L_5$ is a planar plate of optical material

What is claimed is:

1. An optical system of relatively short focal length and large aperture having substantially the following specification:

EFL = 8.15mm (.3210 inch)
½ Angle of Field = 2.58°

| LENS | RADII (IN.) | THICKNESS (IN.) | SPACING (IN.) |
|---|---|---|---|
| $L_1$ | $R_1 = .7769$<br>$R_2 = -2.3681$ | $D_1 = .0789$ | $S_1 = .0426$ |
| $L_2$ | $R_3 = -.2595$<br>$R_4 = .3121$ | $D_2 = .1018$ | $S_2 = .4138$ |
| $L_3$ | $R_5 = .5445$<br>$R_6 = -17.9612$ | $D_3 = .0825$ | $S_3 = .0050$ |
| $L_4$ | $R_7 = .2298$<br>$R_8 = -.3047$ | $D_4 = .1252$ | $S_4 = .0150$ |
| $L_5$ | $R_9 = $ Inf.<br>$R_{10} = $ Inf. | $D_5 = .0492$ | BFL = .1734<br>$0 \leq S_5 \leq .1092$ |

For Elements $L_1$ to $L_4$, V = 25.4, $N_D$ = 1.805
Element $L_5$ is a glass plate wherein the first column lists the lens elements numerically starting at the ray entrance side of the system which elements each have the same dispersive index and refractive index; the second column lists the respective base radii $R_1$ to $R_{10}$; the third column lists the thickness $D_1$ to $D_5$ of the respective elements; and the fourth column lists the axial spacings $S_1$ to $S_5$ between the respective elements, and the image plane.

2. An optical system of relatively short focal length and large aperture having substantially the following specification:

EFL = 7.90mm
½ Angle of Field = 2.58°

| LENS | RADII (IN.) | THICKNESS (IN.) | SPACING (IN.) |
|---|---|---|---|
| $L_1$ | $R_1 = .8907$<br>$R_2 = 2.6356$ | $D_1 = .0847$ | $S_1 = .0368$ |
| $L_2$ | $R_3 = -.2547$<br>$R_4 = .3533$ | $D_2 = .3018$ | $S_2 = .0897$ |
| $L_3$ | $R_5 = .4093$<br>$R_6 = A(1)$ | $D_3 = .1192$ | $S_3 = .0000$ Et |
| $L_4$ | $R_7 = .2320$<br>$R_8 = -.1818$ | $D_4 = .1771$ | $S_4 = .1200$ |
| $L_5$ | $R_9 = $ Inf.<br>$R_{10} = $ Inf. | $D_5 = .0492$ | BFL = .1692<br>$0 \leq S_5 \leq .0800$ |

ALL LENSES: V = 57.4 $N_D$ = 1.4917 wherein the first column lists the lens elements numerically starting at the ray entrance side of the system which elements each have the same dispersive index and refractive index; the second column lists the respective base radii $R_1$ to $R_{10}$ and/or the aspheric term thereof; the third column lists the thickness $D_1$ to $D_5$ of the respective elements; and the fourth column lists the axial spacings $S_1$ to $S_5$ between the respective elements, and the image plane.

3. An optical system of relatively short focal length and large aperture having substantially the following specification:

EFL=10.31mm
½ Angle of Field=2.58°

| LENS | RADII (IN.) | THICKNESS (IN.) | SPACING (IN.) | V | $N_D$ |
|---|---|---|---|---|---|
| $L_1$ | $R_1 = .7875$<br>$R_2 = -2.4274$ | $D_1=.0788$ | $S_1=.0434$ | 25.4 | 1.805 |
| $L_2$ | $R_3 = -.2580$<br>$R_4 = .3100$ | $D_2=.1200$ | $S_2=.4077$ | 57.4 | 1.4917 |
| $L_3$ | $R_5 = .5425$<br>$R_6 = -21.4864$ | $D_3=.0900$ | $S_3=.0050$ | 25.4 | 1.805 |
| $L_4$ | $R_7 = .2306$<br>$R_8 = -.3056$ | $D_4=.1250$ | $S_4=.0150$ | 57.4 | 1.4917 |
| $L_5$ | $R_9 = $ Inf.<br>$R_{10}= $ Inf. | $D_5=.0492$ | BFL=.2180<br>$0 \leq S_5 \leq .1538$ | | | wherein the first column lists the lens elements numerically starting at the ray entrance side of the system which elements each have the same dispersive index and refractive index; the second column lists the respective base radii $R_1$ to $R_{10}$; the third column lists the thickness $D_1$ to $D_5$ of the respective elements; the fourth column lists the axial spacings $S_1$ to $S_5$ between the respective elements, and the image plane; and the fifth and sixth columns respectively lists the dispersive index V and the refractive index $N_D$ of the optical materials of the respective elements.

4. An optical system of relatively short focal length and large aperture having substantially the following specification:

EFL=8.44mm
½ Angle of Field=2.58°

| LENS | RADII (IN.) | THICKNESS (IN.) | SPACING (IN.) | V | $N_D$ |
|---|---|---|---|---|---|
| $L_1$ | $R_1 = .7875$<br>$R_2 = -2.4274$ | $D_1=.0788$ | $S_1=.0434$ | 25.4 | 1.805 |
| $L_2$ | $R_3 = -.2580$<br>$R_4 = .3100$ | $D_2=.1200$ | $S_2=.4077$ | 57.4 | 1.4917 |
| $L_3$ | $R_5 = .5425$<br>$R_6 = -21.4864$ | $D_3=.0900$ | $S_3=.0050$ | 25.4 | 1.805 |
| $L_4$ | $R_7 = .2306$<br>$R_8 = .3056$ | $D_4=.1250$ | $S_4=.0510$ | 25.4 | 1.805 |
| $L_5$ | $R_9 = $ Inf.<br>$R_{10}= $ Inf. | $D_5=.0492$ | $0 \leq S_5 \leq .1067$ | | | wherein the first column lists the lens elements numerically starting at the ray entrance side of the system which elements each have the same dispersive index and refractive index; the second column lists the respective base radii $R_1$ to $R_{10}$; the third column lists the thickness $D_1$ to $D_5$ of the respective elements; the fourth column lists the axial spacings $S_1$ to $S_5$ between the respective elements, and the image plane; and the fifth and sixth columns respectively lists the dispersive index V and the refractive index $N_D$ of the optical materials of the respective elements.

5. An optical system of relatively short focal length and large aperture having substantially the following specification:

EFL = 8.37 mm
½ Angle of Field = 2.58°

| LENS | RADII (IN.) | THICKNESS (IN.) | SPACING (IN.) |
|---|---|---|---|
| $L_1$ | $R_1 = 1.2531$ | $D_1 = .0850$ | $S_1 = .0360$ |
|  | $R_2 = 3.6469$ |  |  |
| $L_2$ | $R_3 = -.2564$ | $D_2 = .2700$ | $S_2 = .0960$ |
|  | $R_4 = .3497$ |  |  |
| $L_3$ | $R_5 = .4348$ | $D_3 = .1130$ | $S_3 = .0050$ |
|  | $R_6 = A(1)$ |  |  |
| $L_4$ | $R_7 = .2344$ | $D_4 = .1800$ | $S_4 = .1268$ |
|  | $R_8 = -.1818$ |  |  |
| $L_5$ | $R_9 = $ Inf. | $D_5 = .0492$ | BFL = .1760 |
|  | $R_{10} = $ Inf. |  | $0 \leq S_5 \leq .0868$ |

ELEMENT $L_1$, V = 29.5, $N_D$ = 1.717
For ELEMENT $L_2$ to $L_4$, V = 57.4, $N_D$ = 1.4917
ELEMENT $L_5$ is a glass plate wherein the first column lists the lens elements numerically starting at the ray entrance side of the system including the planar plate member; the second column lists the respective base radii $R_1$ to $R_{10}$ and/or the aspheric term thereof; the third column lists the thickness $D_1$ to $D_5$ of the respective elements; and the fourth column lists the axial spacings $S_1$ to $S_5$ between the respective elements and the image plane.

6. An optical system of relatively short focal length and large aperture having substantially the following specification:

EFL = 7.88mm (.3104 inch)
½ Angle of Field = 2.58°

| LENS | RADII (IN.) | THICKNESS (IN.) | SPACING (IN.) |
|---|---|---|---|
| $L_1$ | $R_1 = 1.3717$ | $D_1 = .0802$ | $S_1 = .0384$ |
|  | $R_2 = 3.1880$ |  |  |
| $L_2$ | $R_3 = -.2510$ | $D_2 = .2942$ | $S_2 = .0903$ |
|  | $R_4 = .3490$ |  |  |
| $L_3$ | $R_5 = .4124$ | $D_3 = .1195$ | $S_3 = .005$ |
|  | $R_6 = A(1)$ |  |  |
| $L_4$ | $R_7 = .2341$ | $D_4 = .1784$ | $S_4 = .1892$ |
|  | $R_8 = -.1818$ |  |  |
| $L_5$ | $R_9 = $ Inf. | $D_5 = .0492$ | BFL = .2384 |
|  | $R_{10} = $ Inf. |  | $0 \leq S_5 \leq .020$ |

ELEMENT $L_1$, V = 29.51, $N_D$ = 1.7172
ELEMENT $L_2$ to $L_4$, V = 57.4, $N_D$ = 1.4917
ELEMENT $L_5$ is a planar plate wherein the first column lists the lens elements numerically starting at the ray entrance side of the system including the planar plate member; the second column lists the respective base radii $R_1$ to $R_{10}$ and/or the aspheric term thereof; the third column lists the thickness $D_1$ to $D_5$ of the respective elements and the fourth column lists the axial spacings $S_1$ to $S_5$ between the respective elements and the image plane.

7. An optical system of relatively short focal length and large aperture having substantially the following specification:

EFL = 7.88mm (.3104 inch)
½ Angle of Field = 2.58°

| LENS | RADII (IN.) | THICKNESS (IN.) | SPACINGS (IN.) |
|---|---|---|---|
| $L_1$ | $R_1 = .8907$ | $D_1 = .0847$ | $S_1 = .0384$ |
|  | $R_2 = 2.6356$ |  |  |
| $L_2$ | $R_3 = -.2547$ | $D_2 = .3018$ | $S_2 = .0903$ |
|  | $R_4 = .3533$ |  |  |
| $L_3$ | $R_5 = .4093$ | $D_3 = .1192$ | $S_3 = .0050$ |
|  | $R_6 = A(1)$ |  |  |
| $L_4$ | $R_7 = .2320$ | $D_4 = .1771$ | $S_4 = .1692$ BFL |
|  | $R_8 = -.1818$ |  |  |

ALL ELEMENTS, V = 57.4, $N_D$ = 1.4917 wherein the first column lists the lens elements numerically starting at the ray entrance side of the system; the second column lists the respective base radii $R_1$ to $R_8$ and/or the aspheric term thereof; the third column lists the thickness $D_1$ to $D_4$ of the respective elements; and the fourth column lists the axial spacings $S_1$ to $S_4$ between the respective elements and the image plane.

8. An optical system of relatively short focal length and large aperture having substantially the following specification:

EFL = 8.18mm (.3222 inches)
½ Angle of Field = 2.58°

| LENS | RADII (IN.) | THICKNESS (IN.) | SPACING (IN.) |
|---|---|---|---|
| $L_1$ | $R_1 = .5791$ | $D_1 = .1172$ | $S_1 = .0129$ |
|  | $R_2 = -6.1495$ |  |  |
| $L_2$ | $R_3 = -.7452$ | $D_2 = .1073$ | $S_2 = .3774$ |
|  | $R_4 = 2.9214$ |  |  |
| $L_3$ | $R_5 = .5840$ | $D_3 = .1325$ | $S_3 = .0030$ |
|  | $R_6 = 1.9319$ |  |  |
| $L_4$ | $R_7 = .1974$ | $D_4 = .1606$ | $S_4 = .0450$ |
|  | $R_8 = .1957$ |  |  |
| $L_5$ | $R_9 = $ Inf. | $D_5 = .0492$ | BFL = .0942 |
|  | $R_{10} = $ Inf. |  | $0 \leq S_5 \leq .0050$ |

ALL ELEMENTS V = 25.4, $N_D$ = 1.805 wherein the first column lists the lens elements numerically starting at the ray entrance side of the system which elements each have the same dispersive index and refractive index; the second column lists the respective base radii $R_1$ to $R_{10}$; the third column lists the thickness $D_1$ to $D_5$ of the respective elements; and the fourth column lists the axial spacings $S_1$ to $S_5$ between the respective elements, and the image plane.

9. An optical system of relatively short focal length and large aperture having substantially the following specification:

EFL = 8.09mm (.3185 inches)
½ Angle of Field = 2.58°

| LENS | RADII (IN.) | THICKNESS (IN.) | SPACING (IN.) |
|---|---|---|---|
| $L_1$ | $R_1 = 1.1900$ | $D_1 = .0958$ | $S_1 = .0108$ |
|  | $R_2 = 1.1900$ |  |  |
| $L_2$ | $R_3 = -.5100$ | $D_2 = .1560$ | $S_2 = .3430$ |
|  | $R_4 = .8665$ |  |  |
| $L_3$ | $R_5 = .4240$ | $D_3 = .1220$ | $S_3 = .0030$ |
|  | $R_6 = -74.0690$ |  |  |
| $L_4$ | $R_7 = .2960$ | $D_4 = .1810$ | $S_4 = .0450$ |
|  | $R_8 = -.3640$ |  |  |
| $L_5$ | $R_9 = $ Inf. | $D_5 = .0492$ | BFL = .0990 |
|  | $R_{10} = $ Inf. |  | $0 \leq S_5 \leq .0048$ |

ALL ELEMENTS V = 25.4, $N_D$ = 1.805
ELEMENT $L_5$ is a planar plate of optical material wherein the first column lists the lens elements numerically starting at the ray entrance side of the system which elements each have the same dispersive index and refractive index; the second column lists the respective base radii $R_1$ to $R_{10}$; the third column lists the thickness $D_1$ to $D_5$ of the respective elements; and the fourth column lists the axial spacings $S_1$ to $S_5$ between the respective elements, and the image plane.

* * * * *